(12) United States Patent
Wesemann

(10) Patent No.: US 9,516,649 B2
(45) Date of Patent: Dec. 6, 2016

(54) TELECOMMUNICATION SYSTEM AND METHOD USING DISTRIBUTED ASYNCHRONOUS BEAMFORMING IN THE MISO INTERFERENCE CHANNEL

(71) Applicant: Vodafone GmbH, Dusseldorf (DE)

(72) Inventor: Stefan Wesemann, Dresden (DE)

(73) Assignee: Vodafone GmbH, Düsseldorf (DE)

(*) Notice: Subject to any disclaimer, the term of this patent is extended or adjusted under 35 U.S.C. 154(b) by 65 days.

(21) Appl. No.: 14/680,691

(22) Filed: Apr. 7, 2015

(65) Prior Publication Data
US 2015/0289248 A1 Oct. 8, 2015

(30) Foreign Application Priority Data

Apr. 7, 2014 (EP) .................................... 14163758

(51) Int. Cl.
*H04W 72/04* (2009.01)
*H04B 7/02* (2006.01)
*H04B 7/04* (2006.01)
*H04B 7/06* (2006.01)
*H04L 5/00* (2006.01)

(52) U.S. Cl.
CPC ........... *H04W 72/046* (2013.01); *H04B 7/022* (2013.01); *H04B 7/024* (2013.01); *H04B 7/0426* (2013.01); *H04B 7/0617* (2013.01); *H04L 5/006* (2013.01); *H04L 5/0073* (2013.01)

(58) Field of Classification Search
CPC ...... H04W 72/046; H04B 7/022; H04B 7/024; H04B 7/0426; H04B 7/0617; H04L 5/006; H04L 5/0073
USPC ..... 455/13.3, 19, 25, 63.4, 82–83, 107, 129, 455/269, 418–420, 450–452.1, 562.1, 455/575.7
See application file for complete search history.

(56) References Cited

U.S. PATENT DOCUMENTS

| 7,502,420 B2* | 3/2009 | Ketchum ............. H04B 7/0417 375/267 |
| 2008/0051045 A1* | 2/2008 | Hwang ............... H04W 52/143 455/127.2 |
| 2010/0117903 A1* | 5/2010 | Zheng ................. H01Q 3/2605 342/373 |

OTHER PUBLICATIONS

European Search Report for 14163758-7 dated Jul. 9, 2014.
Rui Zhang et al: "Cooperative Interference Management With MISO Beamfornning", IEEE Transactions on Signal Processing, vol. 58, No. 10, Oct. 1, 2010, pp. 5450-5458, ISSN: 1053-587X.
Schmidt D et al: "Distributed resource allocation schemes", IEEE Signal Processing Magazine, vol. 26, No. 5, Sep. 1, 2009, pp. 53-63, ISSN: 1053-5888, DOI: 10.1109/MSRP.2009.933371.

* cited by examiner

*Primary Examiner* — Michael Mapa
(74) *Attorney, Agent, or Firm* — Workman Nydegger

(57) ABSTRACT

A cellular telecommunication system comprising at least two communicatively coupled radio transmitter stations is described, wherein the stations are communicatively coupled via a backhaul link. Each base station is capable of beamforming, i.e. controlling the propagation direction of a transmitted radio signal. The radio base stations mutually exchange information regarding the beamforming in order to iteratively optimize the system performance (e.g. throughput, fairness, etc.).

14 Claims, 4 Drawing Sheets

TELECOMMUNICATION SYSTEM AND METHOD USING DISTRIBUTED ASYNCHRONOUS BEAMFORMING IN THE MISO INTERFERENCE CHANNEL

CROSS-REFERENCE TO RELATED APPLICATIONS

This application claims priority to European Patent Application Number 14163758.7, filed on Apr. 7, 2014, the entirety of which is incorporated herein by reference.

BACKGROUND OF THE INVENTION

1. The Field of the Invention

The invention relates to a telecommunication system comprising a plurality of communicatively coupled radio transmitter stations, wherein the radio transmitter stations are configured for exchanging information via a backhaul link to reduce intercell interference

2. The Relevant Technology

Unless otherwise indicated herein, the materials described in this section are not prior art to the claims in this application and are not admitted to be prior art by inclusion in this section. The use of the term "background" is inclusive of the term "context." Thus, the following section provides both context for the disclosure and may also provide patentable support for the claims.

Mobile communication systems, also known as cellular telecommunication systems, typically comprise a plurality of adjoining communication cells, wherein each cell is determined by the radio range of the stationary transceiver station. Stationary transceiver stations are known as base stations in the early mobile telecommunication systems such as GSM or GPRS or as eNodeB in the UMTS or as access points in wireless LAN systems. In the following the stationary transceiver stations are called base stations. Each cell, i.e. the base station within a cell, may serve a plurality of mobile stations by providing a radio link for up- and downlink communication, wherein a mobile station can be a cell phone or a so-called smartphone or any other device capable of exchanging information via the radio link with the base station. Though the devices actually may be mobile or non-mobile, i.e. geographically fixed, the following description deploys the term mobile device. Note that the invention shall not be limited to any particular hardware or radio communication protocol.

When a base station transmits information to a mobile station, i.e. downlink communication, the base station typically does not radiate the signal with its maximum power. Instead the radiation parameters including radiation power are adapted according to the channel properties. However, at the receiving mobile station the signal from the base station is received with interference, i.e. the received signal is a superposition of a plurality of signals, i.e. the received signal comprises the desired signal as well as interfering signals of a plurality of sources.

In particular mobile stations located at the borderline of a cell will suffer from signals radiated by the at least one adjacent cell, since the radio range of each cell overlaps adjacent cells depending on the transmission power of the base stations. Accordingly the mobile station located at an edge of a cell will suffer from so-called inter cell interference upon reception, since radio signals radiated by base stations of adjoining cells interfere, i.e. superpose, with signals radiated by the base station currently associated with the mobile station.

To mitigate these adverse effects of inter cell interference it has been proposed to optimize the radiations by beamforming based on information exchange between base stations of adjoining cells. By directing the radiation beam of a base station to an associated and intended mobile station, the interference to other mobile stations caused by that radiation can be reduced. In this way the overall performance of the system may be improved by reducing inter cell interference. However, the optimization may require several iterations of beamformer adaptation and information exchange. Since conventional systems suffer from communication delays caused by transmission delays in the connecting backhaul link, the entire optimization process is slowed down. Further, existing optimization schemes cannot tolerate concurrent beamformer adaptations; that is, the base stations have to accomplish their adaptations in a sequential fashion. Consequently, conventional systems require a synchronization mechanism for their optimization process. Hence it is an object of the invention to at least mitigate these problems, i.e. to speed-up this optimization process and to enable an optimization process in networks without any synchronization mechanisms.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
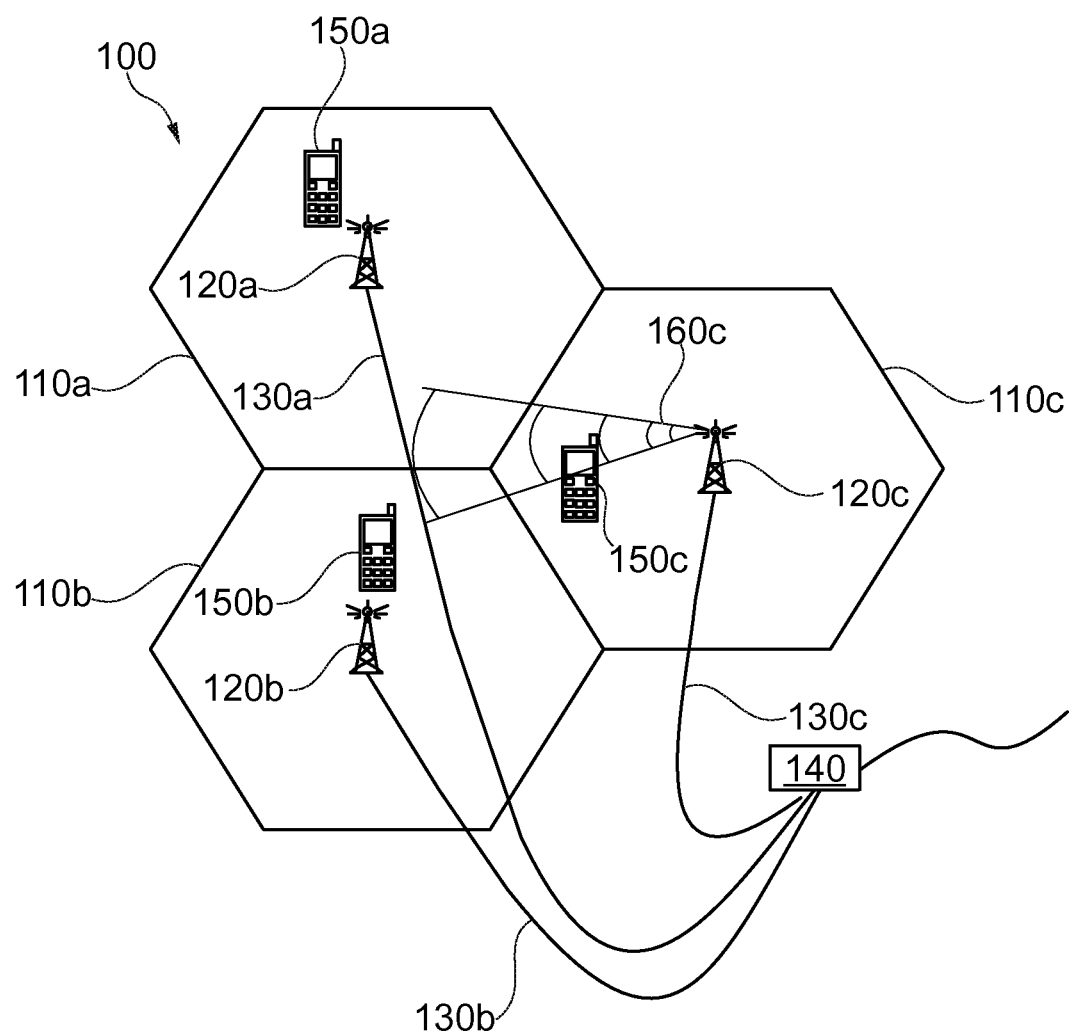
FIG. 1 depicts a diagram of a cellular telecommunication system.

FIG. 1 depicts a diagram of a cellular communication system 100 comprising a plurality of adjoining cells 110a-110. Each cell comprises a base station 120a-120c that provides a radio interface to mobile stations residing in the cell, i.e. the mobile stations are associated with the base station. Mobile station 150a may reside in cell 110a and may be associated with base station 120a and mobile stations 150b, 150c may be associated with the respective base station 120b, 120c of the respective cell 110b and 110c.

A mobile station 150 can be any electronic device capable of exchanging information via the radio interface provided by the base station of a cell, i.e. a mobile station can be a cellular mobile phone, a so-called smartphone, a tablet or laptop computer or any other stationary or mobile device capable of exchanging, particularly receiving, information via the radio link, wherein the device may deploy one effective receive antenna. However, in case the receiver comprises a plurality of receive antennas, we assume that these are deployed for receiving a single transport stream at a time, i.e. the receiver may deploy a combining, e.g. a maximum ratio combining, to receive the single transport stream. Thus the multiple antennas of a mobile station are considered as one effective antenna.

In one embodiment the base stations form part of a radio access network, a so-called RAN, of a cellular telecommunications network. The base stations are communicatively coupled by reliable, typically but not necessarily, wired communication links 130, wherein said communication links may couple the respective base station to other nodes 140, e.g. base station controllers or SGSNs, of the radio access network. Base stations 120 of at least adjoining cells in this way are communicatively coupled for information exchange either via bridging nodes 140 or directly, i.e. without any bridging node (not shown in the figure). The information exchange between base stations that are not directly coupled, relies on message forwarding by other base stations. Subsequently the communication network enables the information exchange between all base stations is denoted as backhaul link.

As briefly noted above the geographical areas of the radio cells 110 overlap, i.e. radiation emitted by a base station does not stop at the edge of an adjacent radio cell. Even if beamforming is used to (egoistically) improve the radiation to the direction of the intended receiving mobile station, the radiated signal will propagate beyond the current location of the intended receiving mobile station. So even if base station 120c radiates a signal 160c that is intended for mobile station 150c and wherein base station 120c has applied a beamforming, said signal will propagate into adjoining cells 110a and 110b and may thus interfere with signals received by mobile stations located in the direction of signal 160, e.g. at the location of mobile station 150b, because base station 120c radiates using the same radio resources as used in the adjoining cell, i.e. the transmission in cell 120c occurs on the same frequency while a mobile station 150b in cell 110b receives a transmission from its associated base station 120b.

Each base station 120 comprises a plurality of at least two transmit antennas and is capable of controlling the direction of radiation, i.e. the base station is capable of so-called beamforming when transmitting. Each base station, i.e. considered here as a transmitter, may control the beamforming by applying a complex valued scalar antenna weight to each of it's transmit antennas. The set of all antenna weights of one transmitter thus may form a beamforming vector of said transmitter. A base station thus may control the geographical radiation pattern when transmitting. In one embodiment this can be achieved by a beamformer control that controls the phase and relative amplitude of the signal transmitted by each antenna of the plurality of transmit antennas in order to create a pattern of constructive and destructive interference in the wavefront at the location of the intended receiver, i.e. at the intended mobile station. In this way the beamforming vector of controls the spatial distribution of a radiated signal.

Figure 2:
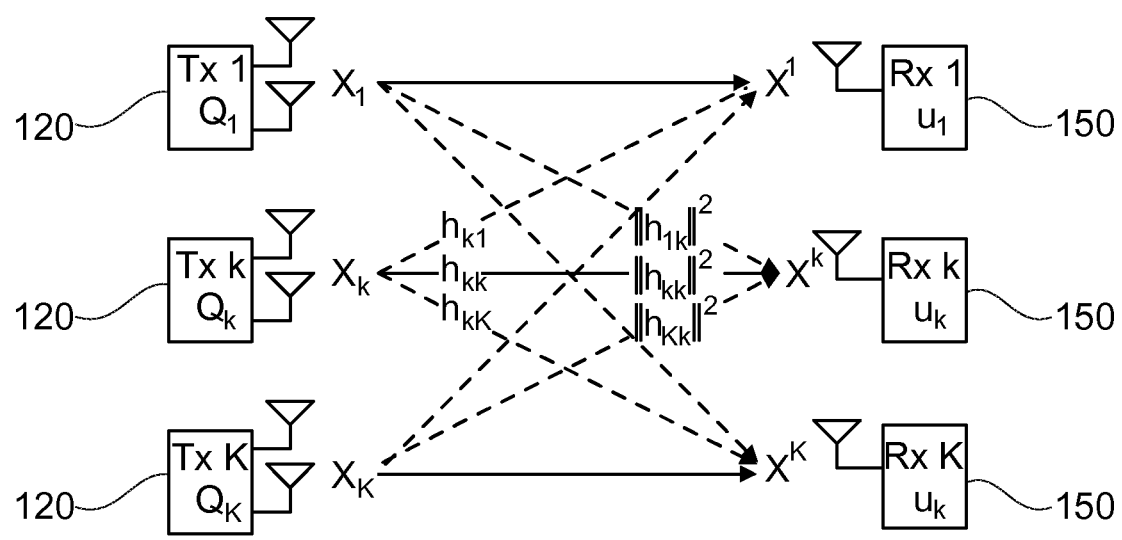
FIG. 2 depicts a MISO scheme according to the invention.

FIG. 2 depicts a schematic illustrating the nomenclature as used in the following. The base stations 120 of the system are considered as transmitters only, i.e. Tx1 . . . Txk . . . TxK, the mobile stations 150 are considered as receivers only, i.e. Rx1 . . . Rxk . . . RxK, wherein letter k is the index of a transmitter or a receiver with 1 . . . k . . . K. Accordingly we consider a system comprising a number of K transmitter receiver pairs that share a common radio resource. Each transmitter aims at conveying a data stream to its associated receiver, wherein a transmission originating from the k-th transmitter to the k-th receiver interferes with transmissions of the other pairs of transmitters and receivers, at receivers 1 . . . k−1 and k+1 . . . K as illustrated by the transfer functions h. The k-th receiver thus observers a superposition of signals from all transmitters but is interested only in the transmit signal from its associated transmitter. Note that index l shall denote any transmitter or receiver station not associated with the k-th transmitter station.

Though each transmitter is shown with two transmit antennas, the system shall not be limited by this, i.e. a transmitter may comprise a plurality of at least two or more transmit antennas.

To optimize the transmissions from a base station, i.e. to optimize the beamforming vector of a transmitter, to an associated receiver, each k-th pair of transmitter and associated receiver is assigned a user utility function u1 . . . uk . . . uK.

The overall performance of the system can be evaluated by considering the sum of all assigned utility functions, i.e. by evaluating a system utility function U being the sum of all functions $u_k$. Each user utility function $u_k$ shall have two properties:

1. $u_k$ is strictly monotonically increasing with respect to the intended (useful) signal power, i.e. receive signal power at the k-th receiver from its associated k-th transmitter,
2. $u_k$ is strictly monotonically decreasing with respect to the interference power, i.e. with respect to the receive signal power at the k-th receiver caused by all transmitters l≠k.

Typical examples of user utility functions reflect the signal-to-interference-plus-noise ratio (SINR) at the receiver, the achievable information rate or the bit error rate.

Above mentioned beamforming vector, i.e. the complex valued scalar antenna weights, of a transmitter is the parameter to be adjusted in order to optimize the overall system performance.

However, it is not the beamforming vector that is considered for optimizing a best system performance (e.g. throughput). Instead, the resulting power gains are considered as variables to be optimized. Hence, for the k-th transmitter we define as optimization variable the power gain vector $x_k$ that comprises all receive powers at all of the receivers, i.e. at the K receivers. Accordingly the l-th component of vector $x_k$ is denoted as $x_{k,l}$ and reflects the received power at the l-th receiver caused by the k-th transmitter.

Furthermore the optimization of the overall system, i.e. the optimization of the system utility function U shall be performed decentralized, i.e. distributed. As a consequence there is no central processing entity for solving said optimization problem, wherein said central processing entity has knowledge of all necessary information about the system, e.g. channel information, and that can solve the optimization problem.

Instead it is assumed, that each transmitter participates in optimizing the system utility function, wherein it is assumed that each k-th transmitter has knowledge about the channels between itself, i.e. the k-th's transmitter and each receiver 1 . . . K, as well as the channel strength between the k-th's receiver and each transmitter 1 . . . K, and wherein the transmitters are communicatively coupled for mutual information exchange. In real life this assumption is realized by receivers 1 . . . k−1, k+1 . . . K, which report information reflecting channel state information to their respective associated base transmitter station. As described below said information is forwarded by the l-th base stations to the k-th base station, thus providing the channel state information between the k-th transmitter and the l-th receiver, i.e. receivers 1 . . . k−1, k+1 . . . K.

Furthermore, an upper bound Tmax on the largest possible update interval (i.e., the largest possible time span between two successive updates of the power gain vector $x_k$), as well as an upper bound Dmax on the largest backhaul delay are known to all transmitters. Therefore, the time is indexed by a discrete variable n which indexes all event of interest (i.e., an update step, a transmission or reception of a message via backhaul). Note that this (global) time variable is only needed for illustration and analysis purposes.

Each transmitter uses a gradient method to iteratively update his local optimization variable $x_k$, i.e. his local power gain vector $x_k$. Each iteration step aims at increasing the value of the system utility function U. Therefore, in each iteration performed at a transmitter the optimization variable $x_k$ is amended in the direction of the steepest increase of function U. For the k-th transmitter the information regarding the steepest increase of system utility function U is given by the gradient vector of system utility function U with respect to the optimization variable, i.e. the optimization vector $x_k$. The gradient vector of the k-th transmitter consists of the partial derivatives $du_1/dx_{k,1}, \ldots du_k/dx_{k,k}, \ldots, du_K/dx_{k,K}$. The components (i.e. partial derivatives) of this gradient vector must be computed by the individual transmitters, i.e. the l-th component of this gradient vector must be calculated by the l-th transmitter, and are exchanged thereafter between the transmitters. This is due to the local/exclusive knowledge of the individual transmitters, none of them has global knowledge. Only the l-th transmitter has the knowledge that is required for calculating the l-th component from the gradient vector of the k-transmitter. By selecting a system utility function that is differentiable, the partial derivatives can be calculated by using closed-form expressions.

As the components of the gradient vectors depend on the actual values of the optimization variable $x_1, \ldots x_k, \ldots, x_K$, i.e. the actual values of the power gain vectors that represent the current operating points of transmitters 1 . . . K, these said gradient vector components have to be updated after each change in the optimization variables. In other words, in order compute the l-th component for the gradient vector of the k-th transmitter, the l-th transmitter needs the knowledge of all power gain vector components $x_{1,l}, \ldots x_{K,l}$.

Since only the k-th transmitter (due to his local knowledge) is able to calculate all components of its optimization variable $x_k$ (i.e., $x_{k1}, \ldots, x_{kK}$), the components of the optimization variables $x_1 \ldots x_k \ldots x_K$ have to be mutually communicated from transmitter to transmitter, i.e. the k-th transmitter sends the l-th component $x_{k,l}$ of his power gain vector $x_k$ to the l-th transmitter. In this way each transmitter communicates each component of his power gain vector to the corresponding transmitter.

Note that the gradient vector components and the updated optimization values, i.e. $x_1 \ldots x_{k-1}, x_{k+1} \ldots x_K$, are real-valued scalars, so the transmitters exchange real valued scalars. As a consequence the amount of data to be communicated between the transmitters via the backhaul link is small, thus supporting a fast and effective implementation of the method and preventing clogging of the backhaul communication link.

Figure 3:
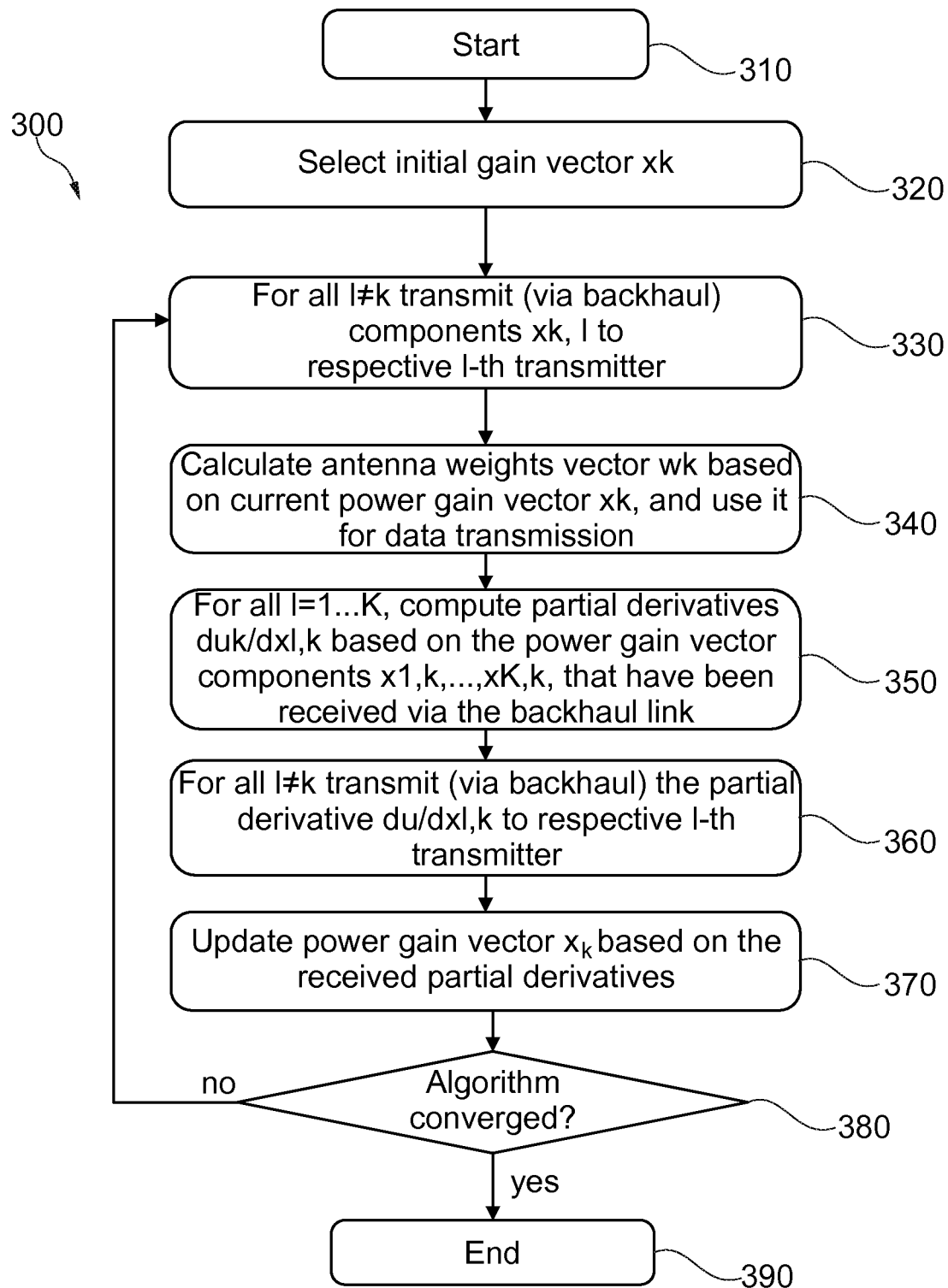
FIG. 3 a flow chart of an optimization method.

FIG. 3 illustrates the method steps 300 iteratively performed by each transmitter at some arbitrary intervals and speed. Note that, all transmitters may keep radiating their signals (i.e. their transport streams) all the time, independently from the optimization process. From time to time, they may adapt their radiation by applying the new antenna weight vector that has been obtained from the (parallel ongoing) optimization process. Such an adaptation will yield an increased system utility.

The following method steps are described from the viewpoint of the k-th transmitter that radiates a signal, wherein said radiated signal is received by the k-th receiver, i.e. the receiver associated with the radiating transmitter and by receivers 1 . . . k−1 as well as receivers k+1 . . . K, i.e. receivers associated with transmitters 1 . . . 1 . . . k−1 and k+1 . . . K of cells adjoining the k-th cell.

The first method step right after start 310 is the selection by at least the k-th transmitter of an initial gain vector $x_k$ in step 320. In step 330 the k-th transmitter transfers all components l≠k of the (current) power gain vector $x_k$ to the respective l-th transmitter.

At step 340, at least the k-th transmitter calculates a new antenna weight vector $w_k$ based on the current power gain vector $x_k$, wherein the current power gain vector in the first iteration of the loop is that of the initial selection of step 320. Otherwise, i.e. in each subsequent loop iteration the k-th transmitter calculates the antenna weight vector based on a gain vector updated in a previous loop iteration, confer below step 370. The k-th transmitter then adapts (its steadily ongoing) signal radiation by using the calculated antenna weight vector $w_k$.

Based on the power gain components $x_{l,k}$, for $l=1, \ldots, K$, received via backhaul link, the k-th transmitter calculates in step 350 the new partial derivatives $du_k/dx_{l,k}$ of his user utility function $u_k$ with respect to the received power gains $x_{l,k}$ of all considered transmitters $l=1, \ldots, K$. Due to the differentiability of the utility functions, there exist closed-form expressions for the partial derivatives.

In step 360 the k-th transmitter, i.e. each considered transmitter, transmits for each l≠k, the calculated partial derivative $du_k/dx_{l,k}$ to the respective l-th transmitter, i.e. to each other of the considered transmitters, via the backhaul link.

In step 370, i.e. when the k-th transmitter has received the partial derivatives $du_l/dx_{k,l}$ of all other transmitters l, the transmitter updates his power gain vector $x_k$. This update computation is described below.

The transmitter then checks in step 380 whether the algorithm converged. Depending on the largest possible backhaul communication delay Dmax and the largest possible inter-update interval Tmax, that is used by any transmitter in the network, the k-th transmitter checks whether the difference between its new calculated power gain vector and its power gain vector from (Dmax+Tmax) time instants before is smaller than a pre-specified threshold.

If the algorithm converged, then the transmitter continues to use the antenna weights that have been calculated with respect to the latest power gain vector $x_k$, and the loop ends, in block 390.

Otherwise, i.e. in case the transmitter detects that the algorithm has not converged, the iteration loop continues with performing step 330, i.e. the k-th transmitter transfers all components l≠k of the power gain vector $x_k$, obtained in step 370, to the respective l-th transmitter In this way the k-th transmitter iterates (in arbitrary intervals, i.e. solely limited by the maximum inter-update period) through a loop until the algorithm converges, i.e. until the system utility function converges.

Note that in step 370 the k-th transmitter may update his individual power gain vector $x_k$ before it has received the most recent partial derivatives. The same holds for step 350, where the transmitter may calculate the partial derivatives before it has received the most recent power gain components. In other words, the transmitter may perform computations based on outdated information. Some transmitters may perform their computations faster than others. The transmitters do not need to communicate to each other at each time instant thus they may exchange information at arbitrary intervals and operate asynchronously.

A few remarks concerning the update computation in step 370: The k-th transmitter adapts the components of vector $x_k$ one step in the direction of the gradient vector. Since the k-th transmitter does not have the information about the system utility function, the k-th transmitter cannot determine the optimal step size for the current update step, i.e. the k-th transmitter cannot determine the step size which provides the highest increase of the system utility function. To prevent an overshoot, i.e. due to a step size too large, the step size must be limited, wherein said limitation of the step size ensures that the system utility function always increases.

This is accomplished by selecting a system utility function that is twice differentiable, i.e. the second derivative is finite for all relevant operation points. Furthermore we consider the delays in communication between the transmitters when communicating the power gain components/partial derivatives, and we consider the absolute value of the second (partial) derivative of the system utility function. The determination of the upper limit for the step size is determined as follows. Initially a function is defined that shall serve as the lower limit for the system utility function. For that purpose, a Taylor polynomial of second order using limits of the second partial derivatives is defined. Subsequently an error term is introduced into that function, which reflects the update step error caused by the use of outdated gradients. The error term is then approximated under deployment of the finite limits of the communication delays and the second-order partial derivatives, while ensuring that the resulting function is a valid lower limit for the system utility function. Some mathematical conversions yield to a quadratic function that allows calculation of a step size limit which under all circumstances guarantees an increase of the quadratic function. Considering now that said quadratic function is a lower bound for the system utility function, it follows that said system utility function necessarily must increase.

Accordingly the algorithm uses defined step sizes and allows especially parallel, i.e. simultaneous, updating of all considered transmitters. Note that this is also true in case the transmitters operate on outdated information (i.e., power gains and partial derivatives) transmitted from other transmitters. As a consequence each transmitter may update his power gain values based on the available information provided by other transmitters, i.e. the transmitters may operate asynchronously.

As mentioned above the beamforming vectors, i.e. the antenna weights, can be calculated based on the power gain vectors. Similar as in our considerations above, it is sufficient to consider the k-th transmitter only for reasons of symmetry.

Before we can calculate the k-th beamforming vector based on the power gain vector, we describe the optimization domain, that is, the domain of the power gain vectors that are used as optimization variables.

Figure 4A:
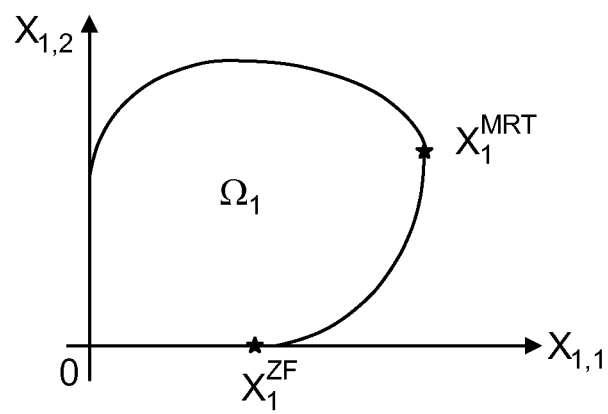
FIGS. 4a and 4b depict a scheme for projecting an updated optimization variable back to the feasible (i.e., constraint) set.
Figure 4B:
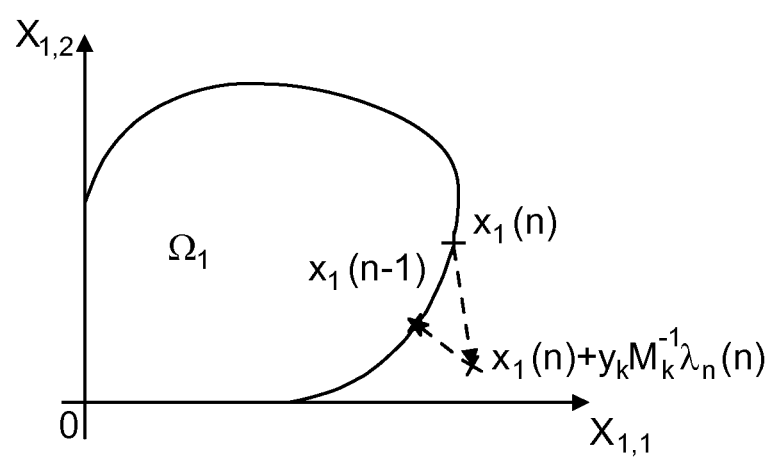

The optimization domain (i.e. the feasible set of power gain vectors) of the k-th transmitter is given by the power gain region $\Omega_k$. Let $\Omega_k$ be the entirety of all possible power gain vectors $x_k$, which transmitter k may generate by radiating a signal $s_k$ using a transmitter correlation matrix $Q=E\{s_k s_k^H\}$. FIG. 4a depicts an illustration of the power gain region $\Omega_k$ for a Multiple-In-Single-Out interference channel, i.e. MISO IFC, with K=2 transmitters, i.e. users. The figure depicts a power gain area $\Omega_1$ for transmitter k=1. Since the system comprises two transmitters, i.e. users, only, the power gain vector of user k=1, i.e. $x_1$, will have two components, wherein $x_{1,1}$ is the power gain, i.e. load power (=useful signal power), to the associated receiver k=1 and $x_{1,2}$ is the interfering power gain received at receiver k=2. Hence the power gain area as depicted in the figure is two-dimensional. Note that FIG. 4 depicts two particular operating points, i.e. two particular power gain vectors:

$x_1^{MRT}$ denotes the egoistic working point $x_1^{MRT}$ (MRT=Maximum Ratio Transmission), where transmitter 1 maximizes its load power $x_{1,1}$ and where any possible interference at receiver k=2 is ignored;

$x_1^{ZF}$ (ZF=Zero Force) is the altruistic working point, where transmitter k=1 does not produce any interference $x_{1,2}$ at receiver k=2, i.e. transmitter k=1 takes what is left.

Note that the area of the power gain is defined by the entity of transmitter correlation matrices being positive semi-definite and having a trace ≤1. This last condition limits the maximum transmission power to 1. Accordingly for generating the power gain area, correlation matrices of arbitrary rank have been used. Consequently, the entity of $\Omega_k$ is convex, which is required for projecting an updated power gain vector $x_k$ back to its valid range (i.e. constraint set), performed in step 370. Considering now that the transmitter always uses only a beamforming vector (i.e. antenna weight vector) for its radiation, then the corresponding correlation matrix is always of rank ≤1. As a consequence the power gain area may comprise operating points, which are not reachable by correlation matrices of rank 1, that is, it may contain power gain vectors that are not achievable by using beamforming vectors. However, it can be demonstrated that all power gain vectors relevant for the sum utility problem, i.e. the stationary operating points of our optimization problem, can be reached with correlation matrices of rank 1. As a consequence, we exploit the convexity of $\Omega_k$, which has been retrieved by relaxing the matrix rank, for the projection in step 370; wherein it is known that the power gain vector, which is obtained when the algorithm 300 has converged, is reachable by a beamforming vector.

Before we can describe how to calculate the k-th beamforming vector based on the power gain vector, we have to illustrate a single update step as performed in step 370. More precisely, we have to illustrate the projection step performed within step 370.

For that purpose we consider, that the k-th transmitter performed an update of his power gain vector $x_k$ at time index n. For that a projection, additionally scaled by matrix $M_k$, of vector $x_k(n)+\gamma_k M_k^{-1}\lambda_k(n)$ onto the convex compact entity of $\Omega_k$ is required, confer FIG. 4b. Note that the vector $\lambda_k(n)$ denotes the vector of all acquired partial derivatives.

Due to the mathematical structure of the power gain region this projection problem can NOT be solved by the entity of power gain vectors, i.e. this is not solvable in the power gain domain since it is unknown a priori which vectors belong to entity $\Omega_k$; this can only be solved by try and error. However, said problem can be solved optimally using the entity of all signal correlation matrices; as noted above the entity of all possible signal correlation matrices defines the power gain area. For that purpose the cost function of the projection problem, i.e. the scaled Euclidian distance between vector $x_k(n)+\gamma_k M_k^{-1}\lambda_k(n)$ and any reachable point of entity $\Omega_k$, is reformulated using correlation matrix Q as the optimization variable for the projection problem, that leads to an equivalent convex optimization problem. Said optimization problem is a quadratic semi-definite optimization problem that can be solved by mathematical conventional tools, e.g. QSDP-0 for Matlab. The solution of said optimization problem, named Q*(n+1) generates the sought-after power gain vector $x_k$(n+1) i.e. the power gain vector that is the solution of update step 370.

Based on Q*(n+1) for time (n+1) a corresponding beamforming vector can be found for the next radiation. Still, there are two problems. We know, $1^{st}$, that power gain vectors associated with stationary points of the optimization problem can be reached by beamforming, i.e. a rank 1 correlation matrix, but that is not true for the power gain vectors that arise during the optimization process (i.e. when the algorithm 300 has not yet converged). And, $2^{nd}$, if matrix Q*(n+1) is of rank ≥2, the corresponding beamforming vector cannot be easily extracted, because the corresponding optimization problem is not convex, even if we know in theory that the associated power gain vector is reachable with rank 1.

Therefore a case-by-case analysis can be made. In the first case matrix Q*(n+1) is of rank 1, which practically is almost true for real life. Then we have to find the dominant eigenvector of said matrix and weight that by the square root of his greatest eigenvalue. That beamforming vector exactly generates the same power gain vector $x_k$(n+1), i.e. the power gain vector for the transmission in the iteration loop of FIG. 3.

Otherwise, in the second case, matrix Q*(n+1) is of rank ≥2. In this case we search for a beamforming vector generating at least the same sum utility. As we consider the user utility function $u_k$ being monotonous, it is sufficient to look for beamforming vectors causing less or the same amount of interference, and which generate at least the same load gain. In order to get this mathematical problem convex, we constrain to solutions, i.e. beamforming vectors, having a particular phase shift, namely the load signal, received by the intended receiver, that is given by $h_{kk}^H w_k$, must be real valued. Note that the optimum solution does not suffer from the phase shift, i.e. the phase shift does not influence the power gains.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cellular telecommunication system comprising a plurality 1 ... 1, k ... K of coupled radio transmitter stations communicatively coupled via a backhaul link and arranged in adjoining radio cells 1 ... 1, k ... K, at least the kth radio transmitter station being capable of beamforming a radiated signal by controlling an antenna weights vector, and wherein the at least kth radio transmitter station is adapted for iterating the steps of:

calculating an antenna weights vector based on kth transmit power gain vector and transmitting a radio signal using the calculated antenna weights;

computing partial derivatives based on components of power gain vector components received via the backhaul link from at least one lth radio transmitter station:

transmit via the backhaul link at least the lth partial derivative of its utility function to the lth radio transmitter station;

updating the kth power gain vector based on the partial derivatives received from the at least lth radio transmitter; and transmitting at least the lth component of the kth power gain vector to the lth radio transmitter station.

2. The cellular telecommunication system according to claim 1, wherein the kth radio transmitter station and the lth radio transmitter station are further adapted to asynchronously exchange partial derivatives and power gains.

3. The cellular telecommunication system according to claim 1, wherein the step of updating the kth power gain vector is based on a defined step size that ensures convergence to a stationary point of the system utility function, said utility function reflecting at least one of the signal-to-interference-plus noise ratio or the achievable information rate or the bit error rate.

4. The cellular telecommunication system according to claim 1, wherein the radio transmitter stations are base stations of a cellular telecommunication network communicatively coupled by a radio access network of the cellular telecommunication network.

5. The cellular telecommunication system according to claim 1, wherein at least a kth receiver is associated with the kth radio transmitter station and an lth receiver is associated with the lth radio transmitter station, wherein at least the lth receiver is adapted to communicate to the lth radio transmitter station the receive power of the signal radiated by the kth radio transmitter station.

6. The cellular telecommunication system according to claim 1, wherein at least the kth transmitter station is further adapted to perform the steps in a loop.

7. The cellular telecommunication system according to claim 1, wherein at least the kth transmitter station is adapted to update its individual power gain vector before receiving the most recent partial derivative from the lth transmitter station.

8. The cellular telecommunication system according to claim 1, wherein at least the kth transmitter station is adapted to calculate the partial derivatives before receiving the lth most recent power gain vector components.

9. A method for optimizing data transmission in a cellular telecommunication system, said system comprising a plurality of plurality 1 ... 1, k ... K of coupled radio transmitter stations communicatively coupled via a backhaul link and arranged in adjoining radio cells 1 ... 1, k ... K, at least the kth radio transmitter station being capable of beamforming a radiated signal by controlling an antenna weights vector, and wherein at least kth radio transmitter station is adapted for performing the method, the method comprising the steps of:

calculating an antenna weights vector based on kth transmit power gain vector and transmitting a radio signal using the calculated antenna weights vector;

computing partial derivatives based on power gain vector components received via the backhaul link from at least one lth radio transmitter station;

transmitting via the backhaul link at least the lth partial derivative of its utility function to the lth radio transmitter station;

updating the kth power gain vector based on the partial derivatives received from the at least lth radio transmitter; and transmitting at least the lth component of the kth power gain vector to the lth radio transmitter station.

10. The method according to claim 9 wherein the kth radio transmitter station and the lth radio transmitter station are further adapted to asynchronously exchange partial derivatives and power gains.

11. The method according to claim 9, wherein the step of updating the kth power gain vector is based on a defined step size that ensures convergence to a stationary point of the system utility function.

12. The method according to claim 9, wherein the radio transmitter stations are base stations of a cellular telecommunication network communicatively coupled by a radio access network of the cellular telecommunication network.

13. The method according to claim 9, wherein the method steps are performed in a loop.

14. The method according to claim 9, wherein the kth transmitter station updates its power gain vector before receiving the most recent partial derivative from the lth transmitter station and the kth transmitter calculates the partial derivatives before receiving the lth most recent power gain vector components.

* * * * *